United States Patent
Barnes et al.

(10) Patent No.: US 8,139,115 B2
(45) Date of Patent: Mar. 20, 2012

(54) METHOD AND APPARATUS FOR MANAGING PARKING LOTS

(75) Inventors: Thomas Henry Barnes, Austin, TX (US); John W. Dunsmoir, Round Rock, TX (US); Sheryl S. Kinstler, Dripping Springs, TX (US); Ramanarayan N. Ramanujam, Hoffman Estates, IL (US); Carol Sue Robertson Watson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1542 days.

(21) Appl. No.: 11/554,196

(22) Filed: Oct. 30, 2006

(65) Prior Publication Data

US 2008/0101656 A1  May 1, 2008

(51) Int. Cl.
*H04N 7/18* (2006.01)
*G08G 1/14* (2006.01)
*G08G 1/01* (2006.01)
*G08G 1/017* (2006.01)

(52) U.S. Cl. ........ 348/149; 348/143; 348/148; 348/159; 340/932.2; 340/933; 340/937

(58) Field of Classification Search .................. None
See application file for complete search history.

(56) References Cited

U.S. PATENT DOCUMENTS

| | | | |
|---|---|---|---|
| 5,680,313 A | 10/1997 | Whittaker et al. | |
| 6,055,042 A | 4/2000 | Sarangapani | |
| 6,285,297 B1 * | 9/2001 | Ball | 340/932.2 |
| 6,340,935 B1 * | 1/2002 | Hall | 340/932.2 |
| 6,546,117 B1 | 4/2003 | Sun et al. | |
| 6,774,908 B2 * | 8/2004 | Bates et al. | 345/589 |
| RE38,716 E | 3/2005 | Caspi et al. | |
| 6,988,032 B2 | 1/2006 | Chiang | |
| 7,116,246 B2 * | 10/2006 | Winter et al. | 340/932.2 |
| 2004/0039632 A1 * | 2/2004 | Han et al. | 705/13 |
| 2005/0083212 A1 * | 4/2005 | Chew | 340/932.2 |
| 2007/0196016 A1 * | 8/2007 | Chen et al. | 382/190 |

\* cited by examiner

*Primary Examiner* — Joseph Ustaris
*Assistant Examiner* — Frederick Bailey
(74) *Attorney, Agent, or Firm* — Yee & Associates, P.C.; Mark C. Vallone

(57) ABSTRACT

A computer implemented method, apparatus, and computer usable program code for tracking vehicles in a parking facility using optics. The process receives a series of two-dimensional images of a vehicle in a parking facility from a camera. The process generates an object representing the vehicle based on the series of two-dimensional images. The object includes a set of parameters defining an outer edge frame for the vehicle. The process determines a location of the vehicle in the parking garage based on the outer edge frame and positional pixel data for the parking facility.

18 Claims, 10 Drawing Sheets

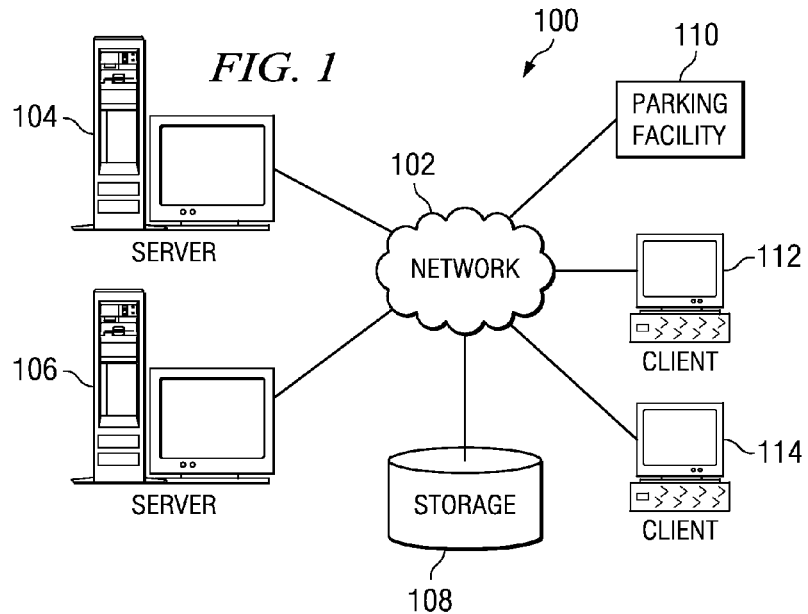
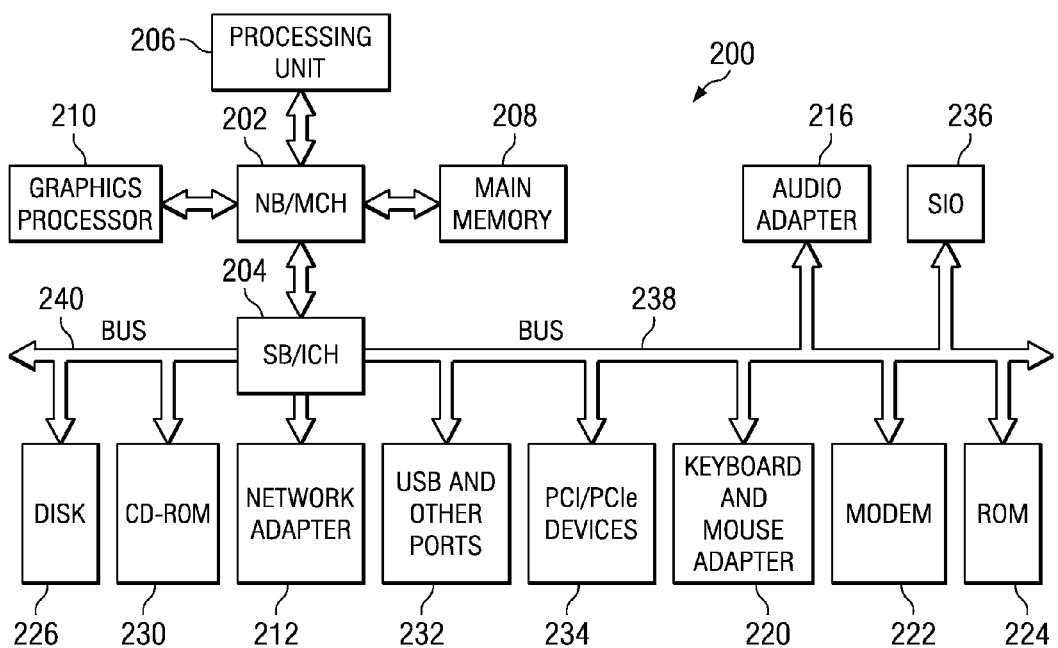

FIG. 4 PARKING MAP TO PARKING LEVEL D

FIG. 12

HORIZONTAL PROFILE

LARGER ANGLE

1200

20 FEET

| PARKING BAY 1202 | PARKING BAY 1204 | PARKING BAY 1206 | PARKING BAY 1208 | PARKING BAY 1210 | PARKING BAY 1212 | PARKING BAY 1214 | PARKING BAY 1216 | PARKING BAY 1218 | PARKING BAY 1220 | PARKING BAY 1222 | PARKING BAY 1224 | PARKING BAY 1226 |

FIG. 13

VERTICAL PROFILE

SMALL ANGLE

1300

10 FEET

| 1302 | 1304 | 1306 | 1308 | 1310 | 1312 | 1314 | 1316 | 1318 | 1320 | 1322 | 1324 | 1326 |

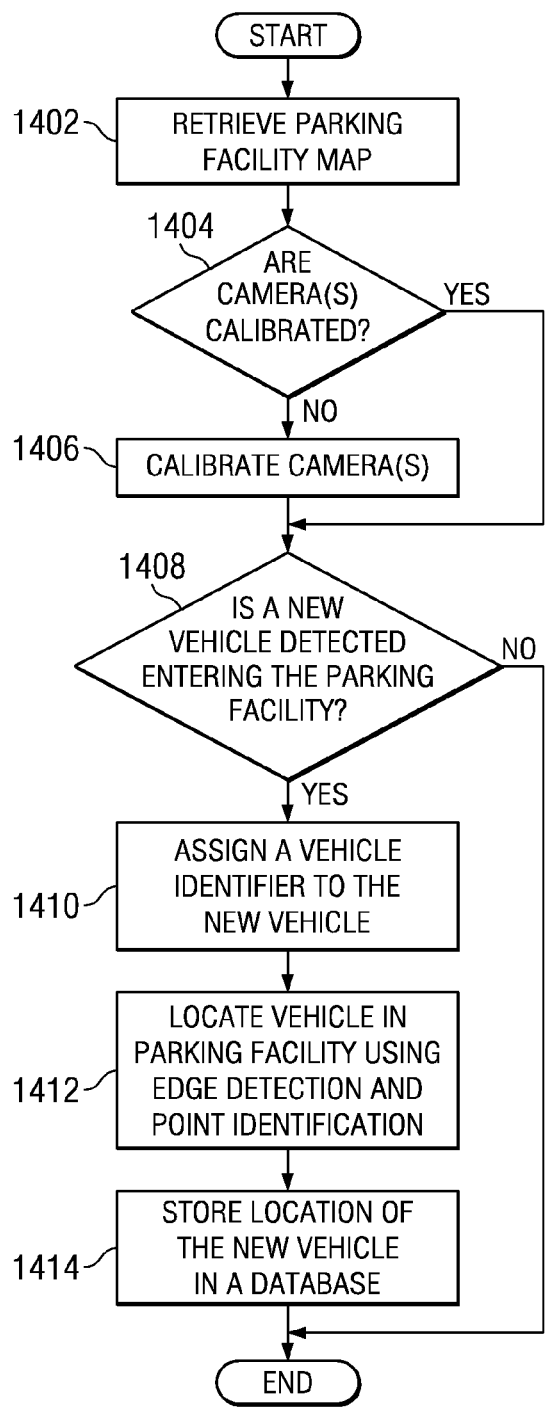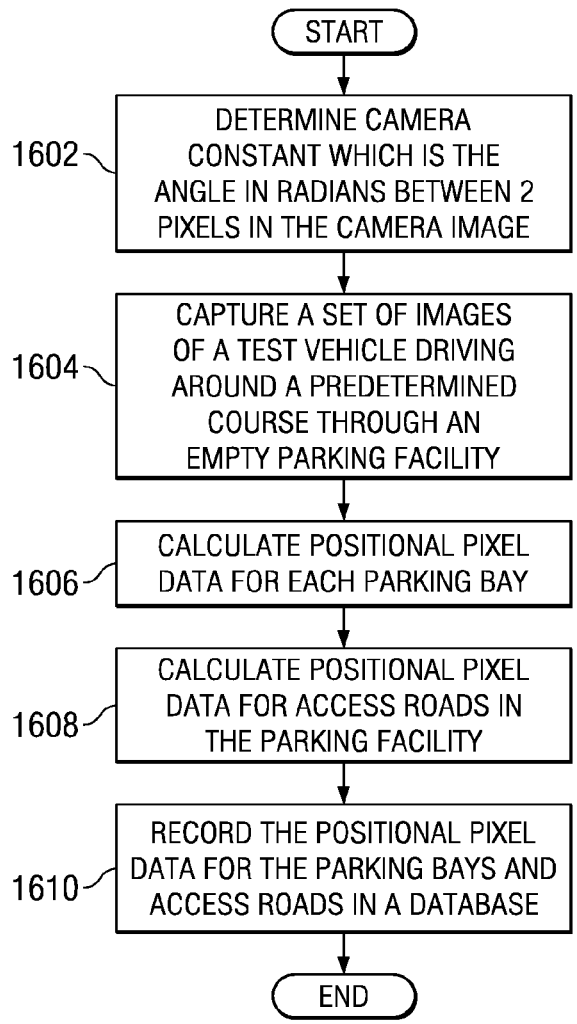

METHOD AND APPARATUS FOR MANAGING PARKING LOTS

BACKGROUND OF THE INVENTION

1. Field of the Invention

The present invention is related generally to an improved data processing system, and in particular to a method and apparatus for tracking vehicles. More particularly, the present invention is directed towards a computer implemented method, apparatus, and computer usable program code for using optics to track vehicles in a parking facility.

2. Description of the Related Art

Contemporary parking facilities, such as parking lots and parking garages, are frequently capable of providing parking spaces for an increasingly large number of vehicles. For example, some multi-story parking garages can accommodate hundreds or even thousands of vehicles. Due to the size of these parking facilities and the number of vehicles located in them, a human user can often encounter great difficulties in attempting to track or locate a particular vehicle.

Currently, some parking facilities track vehicles by manually filling out information regarding the vehicle and/or a parking location for the vehicle on a form, tag, or other record. Other parking facilities hang a tag or car key for a particular vehicle on a hook associated with a designated parking space. However, this method is generally only utilized in smaller parking facilities that accommodate relatively small numbers of vehicles, such as small open air parking lots. In addition, this method requires a human user or attendant to manually identify the parking spot selected for the vehicle and manually fill out the documentation and/or manually hang the car keys for the given vehicle on an appropriate hook or slot. However, the cost of attendants to manually identify or assign a parking location can be cost prohibitive. In addition, in larger parking facilities that accommodate hundreds of vehicles, this method can be impractical due to the large number of parking spaces and vehicles.

Some parking facilities currently employ designated parking to track vehicles. Each driver that wants to park in the parking facility is provided with a designated parking spot. This method can result in confusion and incorrect vehicle information where human users park in an undesignated or incorrect parking spot. In addition, this method can be impractical and result in delays and increased traffic congestion due to the time required to designate or assign a parking space to each vehicle. Likewise, the cost of providing attendants to assign parking spaces and ensure that vehicle drivers park in a correct space can be cost prohibitive.

In parking facilities in which parking spaces are not assigned or manually tracked, a user must attempt to remember where a particular vehicle is parked. If a user forgets where the vehicle is parked, the user may have to visually inspect every vehicle in the parking facility until the user's vehicle is located. This method can be time consuming and frustrating for human users with a poor memory and/or human users who must leave their vehicle parked in a parking facility for an extended period of time, such as a parking garage at an airport.

Finally, the current methods of tracking vehicles do not provide a means to track a location of a vehicle before it enters a designated parking spot and/or after the vehicle leaves the designated parking spot. In other words, a user cannot determine the location of a vehicle when the vehicle is driving on access roads associated with the parking facility unless a user watches the vehicle as the vehicle moves through the parking facility.

SUMMARY OF THE INVENTION

The illustrative embodiments provide a computer implemented method, apparatus, and computer usable program code for tracking vehicles in a parking facility using optics. The process receives a series of two-dimensional images of a vehicle in a parking facility from a camera. The process generates an object representing the vehicle based on the series of two-dimensional images. The object includes a set of parameters defining an outer edge frame for the vehicle. The process determines a location of the vehicle in the parking garage based on the outer edge frame and positional pixel data for the parking facility.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 is a pictorial representation of a network of data processing systems in which illustrative embodiments may be implemented;

FIG. 2 is a block diagram of a data processing system in which illustrative embodiments may be implemented;

FIG. 4 is a block diagram of a map for a single level of a parking facility in accordance with an illustrative embodiment;

FIG. 12 is a block diagram of a parking garage with a high ceiling in accordance with an illustrative embodiment;

FIG. 13 is a block diagram of a parking garage with a low ceiling in accordance with an illustrative embodiment;

FIG. 14 is a flowchart illustrating a process for tracking a vehicle in a parking facility in accordance with an illustrative embodiment;

FIG. 16 is a flowchart illustrating a process for a process for calibrating a camera in accordance with an illustrative embodiment.

DETAILED DESCRIPTION OF THE PREFERRED EMBODIMENT

Figure 3:
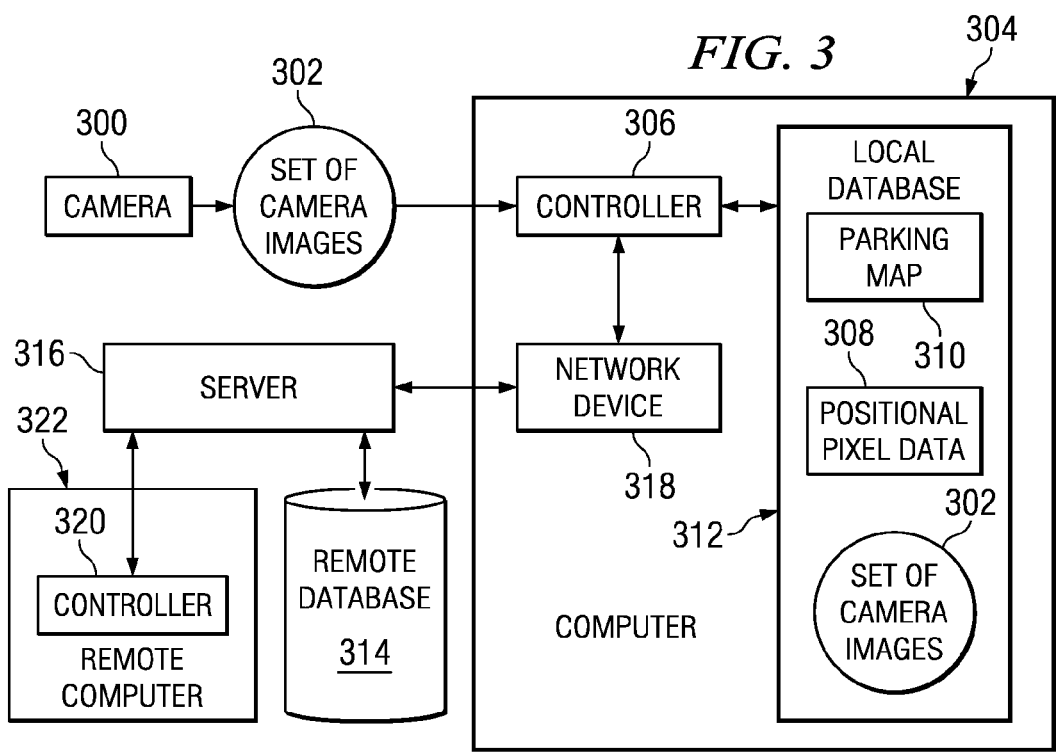
FIG. 3 is a block diagram illustrating a dataflow during a process of locating a vehicle using a two-dimensional camera image in accordance with an illustrative embodiment.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, parking facility 110, and clients 112 and 114 connect to network 102. Parking facility 110 is an area designated for use in parking or storing vehicles. As used herein, a parking facility, such as parking facility 110, includes a single or multi-story parking garage, an open air (unenclosed) parking lot, a partially or completely enclosed parking lot, a car port, a new or used car lot, a vehicle wrecking yard, a car deck on a boat or ferry, a tarmac, an airport runway, a road, a street, or any other area where vehicles can be parked and/or stored. A parking facility includes both public and private parking facilities.

A parking garage is sometimes also referred to as a car park, a parking deck, a parkade, a parking arcade, a parking structure, or a parking ramp. The term parking garage includes a single story parking garage, a multi-story parking garage, an underground or below grade parking garage, an above ground parking garage, or a parking garage that is partially above ground and partially below ground.

Parking facility 110 includes the physical structure of the parking facility, one or more cameras, and any hardware and/or software for processing camera images to locate, track, or manage vehicles in parking facility 110. The hardware for processing camera images can include a computer, such as clients 112 and 114.

Clients 112 and 114 may be, for example, personal computers or network computers. In the depicted example, server 104 provides data, such as boot files, operating system images, and applications to clients 112 and 114. Clients 112 and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which illustrative embodiments may be implemented. Data processing system 200 is an example of a computer, such as server 104 or client 110 in FIG. 1, in which computer usable code or instructions implementing the processes may be located for the illustrative embodiments.

In the depicted example, data processing system 200 employs a hub architecture including a north bridge and memory controller hub (MCH) 202 and a south bridge and input/output (I/O) controller hub (ICH) 204. Processor 206, main memory 208, and graphics processor 210 are coupled to north bridge and memory controller hub 202. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processor 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200. Java and all Java-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processor 206. The processes of the illustrative embodiments may be performed by processor 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

The illustrative embodiments provide a computer implemented method, apparatus, and computer usable program code for tracking vehicles in a parking facility using optics. The process receives a series of two-dimensional images of a vehicle in a parking facility from a camera. The process generates an object representing the vehicle based on the series of two-dimensional images. A series of images is at least two or more consecutive images.

The object includes a set of parameters defining an outer edge frame for the vehicle. In the illustrative examples, the outer edge frame is a pentagonal or pentagon-shaped outer edge. However, the outer edge frame can include any other outer edge shape, including a triangular outer edge frame, a quadrilateral outer edge frame, a hexagonal outer edge frame, or any other polygonal shaped outer edge frame for defining the outer edges and points of a vehicle.

The process determines a location of the vehicle in the parking garage based on the polygonal outer edge frame and positional pixel data for the parking facility. In this manner, the process can provide a precise location for any vehicle moving or parked inside a parking facility using a series of images recorded by one or more cameras.

As used herein, the term vehicle refers to any means by which someone travels or is conveyed. A vehicle can include, but is not limited to, an automobile, a truck, a bus, a motorcycle, a moped, a trike (three-wheeled) motorbike, an amphibious car-boat, a recreational vehicle (RV), a motor home, a roadable aircraft (flying car), an airplane, or any other means by which someone or something is carried or conveyed. A vehicle can have any number of wheels, including two wheeled vehicles, three wheeled vehicles, in addition to vehicles having four or more wheels.

As used herein, a user can include a driver of a vehicle, a passenger in a vehicle, an owner of a vehicle, an owner of a parking facility, an operator of a parking facility, a manager of a parking facility, an employee of a parking facility, or any other person attempting to manage, track, or locate a vehicle parked in a parking facility or moving through a parking facility.

FIG. 3 is a block diagram illustrating a dataflow during a process of locating a vehicle using a two-dimensional camera image in accordance with an illustrative embodiment.

Camera 300 is any type of known or available video camera for recording moving images. In these examples, camera 300 is located within or adjacent to a parking facility, such as parking facility 110 in FIG. 1. Camera 300 is positioned such that it can capture images of vehicles in the parking facility.

Camera 300 may be fixed or remotely movable by a motor in these examples. Camera 300 can include, but is not limited to, a conventional video camera, a digital video camera, a stationary video camera, a webcam, and/or a satellite camera. In this illustrative example, camera 300 is a single stationary camera. However, in another illustrative embodiment, camera 300 can include a set of two or more cameras located at different positions within a parking facility.

Camera 300 captures set of camera images 302 of a moving vehicle and/or a stationary vehicle. Set of camera images 302 is a set of two or more consecutive camera images of one or more vehicles in the parking garage. Each camera image in set of camera images 302 is composed of a set of pixels.

Camera 300 sends set of camera images 302 to computer 304. Computer 304 is any type of computing device, such as a server, a client, a personal computer, a laptop, a personal digital assistant, or any other computing device depicted in FIGS. 1 and 2.

Each two-dimensional camera image in set of camera images 302 is composed of pixels. A pixel (picture element) is the smallest discrete component of a camera image. Each pixel in each two-dimensional camera image includes pixel data. Computer 304 uses the pixel data in each camera image to determine an exact or nearly exact location of each vehicle in the parking facility independently of the position of camera 300.

Controller 306 is a software component for managing, tracking, and locating vehicles in a parking facility. Controller 306 determines a precise location on the floor of the parking facility for every pixel in a two dimensional camera image.

Controller 306 generates a vehicle object representing a given vehicle in the parking facility. The object includes eight positional parameters for the vehicle represented by the vehicle object. The controller uses the eight positional parameters to define a pentagonal outer edge frame for the vehicle object. The pentagonal outer edge frame forms a three dimensional model for the vehicle that can be used to determine where the vehicle is located in the view of camera 300.

Controller 306 does not need to know the precise location, height, or direction of camera 300 when camera 300 is set up. Controller can calculate this information for itself based on calibration data.

Controller 306 is calibrated when the parking facility or a given level of the parking facility is empty. A test vehicle is driven around a pre-determined course in the given level of the parking facility. Camera 300 records a set of two-dimensional calibration camera images of the test vehicle. Controller 306 calculates positional pixel data 308 for the parking bays and access roads on the given level of the parking facility based on pixel data from the set of calibration camera images.

Positional pixel data 308 indicates a location in the parking facility corresponding to a given pixel. Thus, controller 306 generates positional pixel data to assign every pixel in an image generated by camera 300 to a real world location in the parking facility.

A map of the parking facility is a map such as parking map 310. Parking map 310 is a map of a single level of a parking facility and/or two or more levels of a multi-level parking facility. Parking map 310 provides approximate dimensions of a given level of a parking facility, locations of each parking bay, locations of access roads, entrances, exits, and other pertinent features of the parking facility. Controller 306 assigns each pixel in camera 300 to a real world location in the parking facility based on the parking map 310.

In other words, controller 306 associates each pixel in camera 300 with a real world location on the floor of the parking facility. Controller 306 can determine a real world location for any image represented by one or more pixels in an image captured by camera 300. In this manner, a user can obtain a precise or near precise location for a vehicle moving through a parking facility or parked in a parking facility in view of a single camera based on two-dimensional images captured by the single camera.

Controller 306 stores set of camera images 302, positional pixel data 308, and parking map 310 in local database 312. Local database 312 is a database for storing information, such as digital camera images, pixel data, vehicle objects, and parking map definitions. Local database 312 is any type of known or available data storage device, such as storage 108 in FIG. 1. In this example, local database 312 is located on or locally to computer 304.

Controller 306 can also store set of camera images 302, positional pixel data 308, and parking map 310 on remote database 314. Remote database 314 is any type of database for storing a collection of data that is not located on computer 304. In this illustrative example, remote database 314 is located on server 316.

Server 316 is any type of server, such as server 104 and 106 in FIG. 1. Server 316 can be a server on a network, such as network 102 described in FIG. 1. Computer 304 accesses remote database 314 on server 316 through a network connection via network device 318.

Network device 318 is any type of network access software known or available for allowing computer 304 to access a network. Network device 318 connects to a network connection, such as network 102 in FIG. 1. The network connection permits access to any type of network, such as a local area network (LAN), a wide area network (WAN), or the Internet.

In this illustrative example, controller 306 is located on computer 304 that is local to camera 300. In another illustrative example, controller 306 can be located remotely to computer 304 and/or remotely to camera 300.

For example, controller 320 is a controller located on remote computer 322. Computer 304 accesses controller 320 through network device 318.

Remote computer 322 is a computing device, such as client 112 or server 106 in FIG. 1. In this example, computer 304 transmits set of camera images 302 to remote computer 322 for processing. Computer 304 may wish to transmit set of camera images 302 for processing on remote computer 322 for a variety of reasons. For example, computer 304 may not include controller 306, controller 306 may be unavailable due to a failure in controller 306, hardware failure, or software failure in computer 304, or heavy utilization of computer 304.

In an alternative example, camera 300 transmits set of camera images 302 to controller 320 located on remote computer 322 for processing. Camera 300 may transmit set of camera images 302 to remote computer 322 if computer 304 is experiencing hardware failures, software problems, such as a virus, or unavailability of computer 304. For example, the parking facility may not have a computer, such as computer 304, located in or attached to the parking facility. In such a case, camera 300 can transmit set of camera images 302 to remote computer 322 for processing offsite or remotely to camera 300.

Turning now to FIG. 4, a block diagram of a map for a single level of a parking facility is shown in accordance with an illustrative embodiment. Parking map 400 is a predefined map of an area of a parking facility. In this example, parking map 400 is a map of a single level, referred to as parking level D, in a multi-level parking garage. Parking map 400 provides the approximate dimensions of the parking level and/or parking lot.

In this illustrative example, parking map 400 is divided up into rectangular sections with only two banks of parking bays. Parking map 400 illustrates where each parking bay 402-428 in the two banks of parking bays are located in the area of the parking facility defined by parking map 400.

Parking map 400 designates access roadways within the parking facility, such as access roadways 434-460. Thus, access roadway 434 for the corresponding parking bay 402 can be identified based on parking map 400.

Parking map 400 also shows entrances and exits. For example, parking map 400 indicates an entrance and/or exit to parking level C 430 and an entrance and/or exit to parking level E 432.

Parking map 400 shows any one-way restrictions, compact car restrictions, disability restrictions, reserved parking slot restrictions, and/or motorcycle restrictions for parking bays and access roads. In other words, access roadway sections adjacent to parking bays 402-428 and valid vehicle movements over access roadways 434-460 are coded into each parking map. Thus, the process of the illustrative embodiments can track and/or identify the location of a vehicle on an access roadway, as well as the location of a vehicle in a parking bay.

Although the parking facility in this illustrative example is a multi-level parking facility, a global parking map showing all parking bays and access roads for every level of the parking facility is not required. A parking map for each individual level, section, or area of a parking facility that includes information regarding how the levels, sections, or areas relate to each other are sufficient to define a map for the entire parking facility. In other words, parking map 400 includes information regarding how parking map 400 for parking level D relates to a parking map for parking level C 430 and a parking map for parking level E 432. Therefore, a global map is not needed. However, a parking map should also include an identification of an approximate position of each camera. However, an exact position of each camera is not required.

Figure 5:
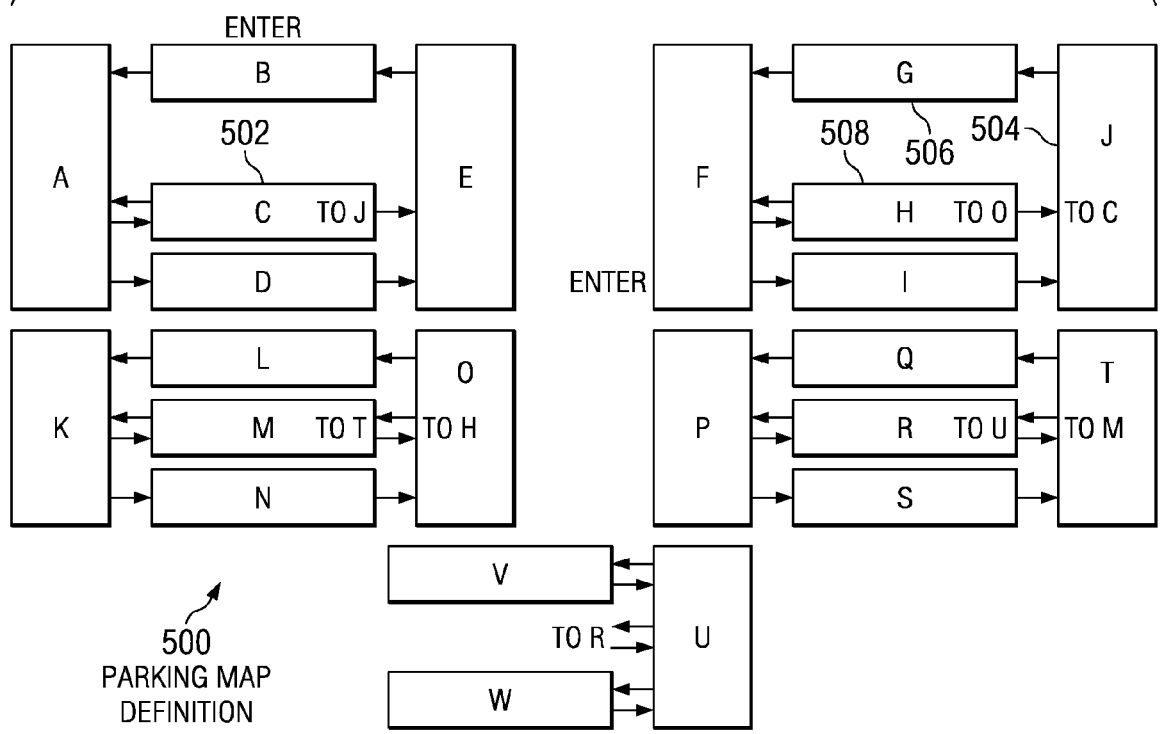
FIG. 5 is a block diagram of a map for a multi-level parking facility in accordance with an illustrative embodiment.

Referring to FIG. 5, a block diagram of a map for a multi-level parking facility is depicted in accordance with an illustrative embodiment. Parking map definition 500 is a parking map definition for a multi-level parking facility, such as a multi-story parking garage. Parking map definition 500 illustrates the relationship of a parking map for each individual level, section, or area of the parking facility with parking maps for every other level, section, or area of the parking facility.

For example, parking map definition 500 illustrates a one-way entrance from an area designated as parking area "C" 502 to an area designated as parking area "J" 504. Parking map definition 500 also includes an illustration of a one-way entrance from parking area "J" 504 back to parking area "C" 502, a one-way entrance to parking area "G" 506, and a one way entrance to parking area "J" 504 from parking area "H" 508.

Thus, parking map definition provides information regarding parking bays and access roads for each area, section, and/or level of a parking facility. The process of the illustrative embodiments uses the information from a parking map definition, such as parking map definition 500, to manage, track, and/or locate any vehicle on an access roadway or in a parking bay associated with the parking facility defined by the parking map definition.

Figure 6:
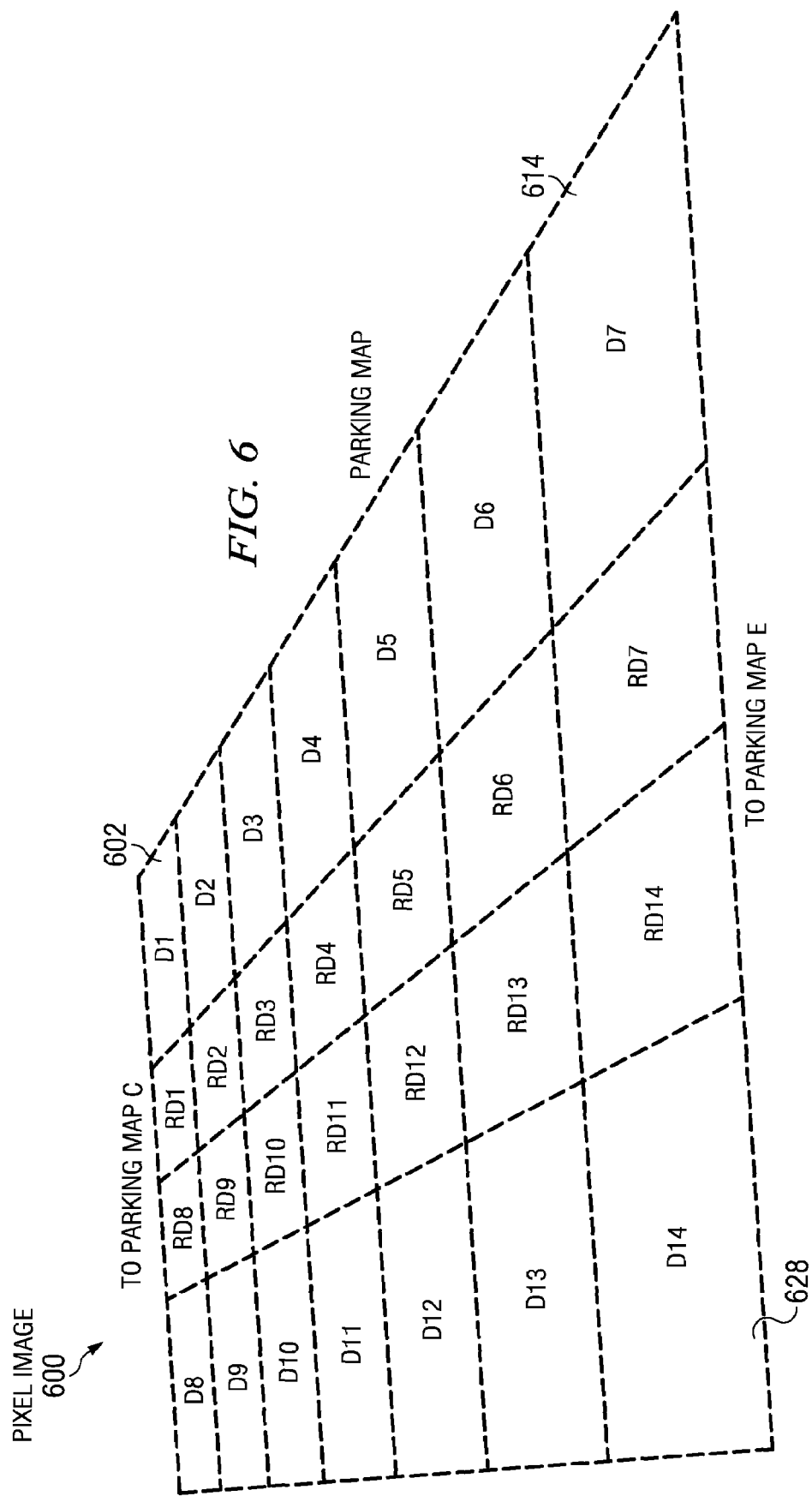
FIG. 6 is a block diagram of a two-dimensional pixel image of a single level of a parking facility in accordance with an illustrative embodiment.

FIG. 6 is a block diagram of a two-dimensional pixel image of a single level of a parking facility in accordance with an illustrative embodiment. Pixel image 600 is a pixel image of an area in a parking facility defined by a parking map, such as parking map 400 in FIG. 4.

Pixel image 600 is a two-dimensional camera image captured by a camera, such as camera 300 in FIG. 3. Parking spots located closer to the camera capturing pixel image 600 are represented by more pixels than parking bays located farther away from the camera. In other words, parking bay D1 602 appears smaller than parking bays D7 614 and D14 628 because parking bays D7 614 and D14 628 are located closer to the camera and, therefore, are represented by more pixels than parking bay D1 602.

Each pixel in the pixel image is treated as an object that has properties. An object is an individual unit of run-time data storage that is capable of receiving messages, processing data, and/or sending messages to other objects. Each object can be viewed as an independent act or building block of a program having a distinct role or responsibility. In this case, each pixel object contains properties associated with the pixel, including a precise location on the floor of the parking facility for the pixel.

Each pixel in pixel image 600 is assigned to a real world location on the floor of the parking facility defined by a parking map, such as parking map 400 in FIG. 4. For example, pixels in section 614 of pixel image 600 correspond to parking bay 414 in FIG. 4. The process assigns each pixel in section 614 representing parking bay D7 to a corresponding real world location in parking bay D7 414.

Each pixel also includes the scale and rotational properties for any vehicle that is parked at that location. In other words, the process can determine the precise location of a vehicle based on the pixels in pixel image 600 representing the vehicle. The process can determine the scale of the vehicle and position of the vehicle in the parking facility based on the pixels representing the vehicle. Thus, each pixel contains all the information regarding how a vehicle should appear if the vehicle is parked at a real world location represented by that pixel in the camera image. The information regarding a vehicle, such as the vehicle location, vehicle pentagonal outer edge frame, points where a vehicle touches the floor of the parking facility, direction of the vehicle wheels, and/or other vehicle properties, are stored in an object representing the vehicle.

In accordance with another illustrative embodiment, two or more cameras can be used to record images of the same area, section, or level of a parking facility. In such a multi-camera situation, the same parking slot can appear in the pixels of images from two or more different cameras. In these cross-camera situations, the process uses the properties of each pixel in the sets of camera images from all the cameras capturing images of the same area of the parking facility to determine which other pixels represent the same location.

In other words, in a situation in which the same area of a parking facility is within the camera view of a set of two or more cameras, the process determines which pixel in the image from each camera in the set of two or more cameras corresponds to the same real world location. In this manner, the images from multiple cameras can be compared and utilized to determine the location of a vehicle.

In accordance with the illustrative embodiments, the process does not need to know the precise location of a camera capturing pixel image 600 in the parking garage, the height of the camera above the floor of the parking garage, or the direction the camera is facing at set-up time. Moreover, the process does not need to know how the parking bays appear in pixel image 600. The process can calculate all the information regarding the location, height, direction of the camera for itself during calibration of the camera. Thus, the process saves the user's time and expense of determining this information and providing this information to the process.

The process can calculate the location, height, direction of the camera for itself during calibration of the camera based on pixel data obtained from a pixel image taken of the parking facility during a calibration of the camera and a camera constant. The camera constant is represented by "C," which is the angle in radians between two pixels in either the horizontal or vertical direction of pixel image 600.

Figure 7:
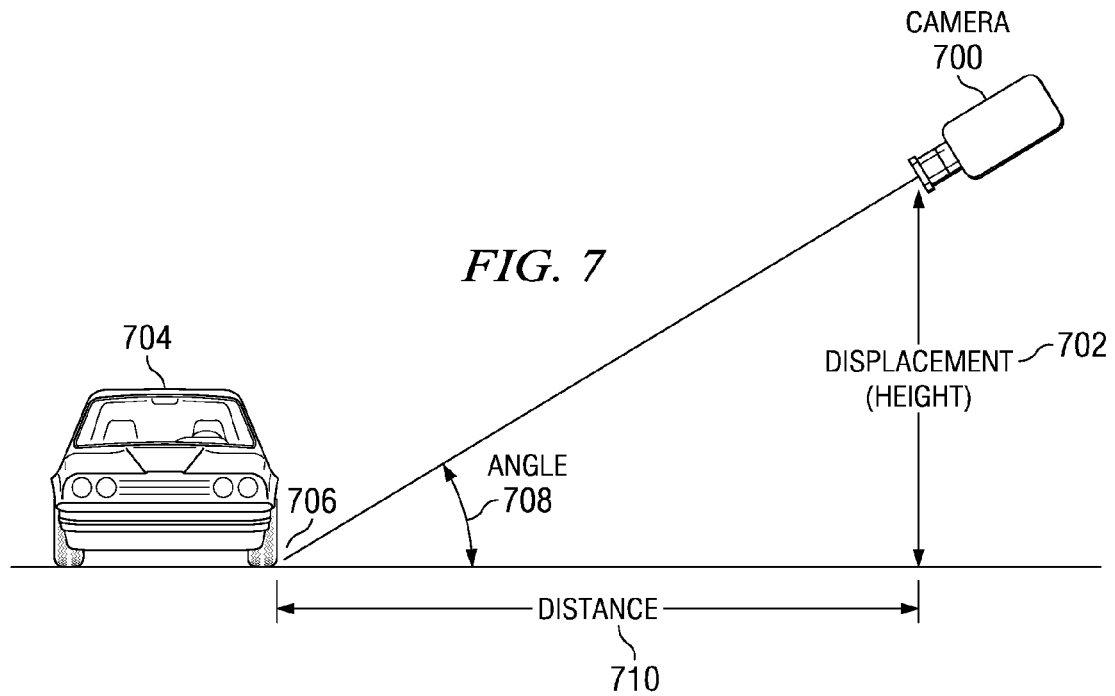
FIG. 7 is a block diagram illustrating an angle between two points on a two dimensional camera image in accordance with an illustrative embodiment.

FIG. 7 is a block diagram illustrating an angle between two points on a two dimensional camera image in accordance with an illustrative embodiment. Camera 700 is a video camera, such as camera 300 in FIG. 3. Displacement (height) 702 is a height of camera 700 above the ground. Vehicle 704 is a vehicle in the view of camera 700. Angle 708 is the angle from the point where vehicle 704 touches the ground 706 to camera 700.

Angle 708 is calculated by multiplying the number of pixels "n" below a horizontal line by the camera constant "C" radians between two pixels. The horizontal line is a horizontal line at the highest pixel in the camera image when viewed at line of sight.

In other words, if a user is facing camera 700 and a hypothetical assumption is made that camera 700 is a grid of pixels, the highest pixel in the grid of pixels when viewed at line of sight by the user is the horizontal line. The pixel distance between this horizontal line and the pixel point which hits the wheel of the vehicle at 706 is the "n" value.

Thus, if camera 700 is located at a height (h) 702 above the floor of a parking facility and the point where a vehicle 704 touches the floor 706 of the parking facility is some number of pixels "n" below a horizontal line, then the distance "d" from camera 700 to the vehicle is the number of pixels "n" multiplied by the camera constant "C" and then divided by the height of the camera. In other words, the distance 710 of the camera from a vehicle can be determined according to the following formula:

$$\text{Distance } (d) = \text{height } (h)/(n*C).$$

The process assumes that the wheels of a vehicle are in contact with the ground. As long as the process can identify the points where a vehicle touches the ground, the process can generate a three dimensional model of the vehicle based on a two-dimensional pixel image of the vehicle. In this manner, the process can determine the precise location of a vehicle.

Figure 8:
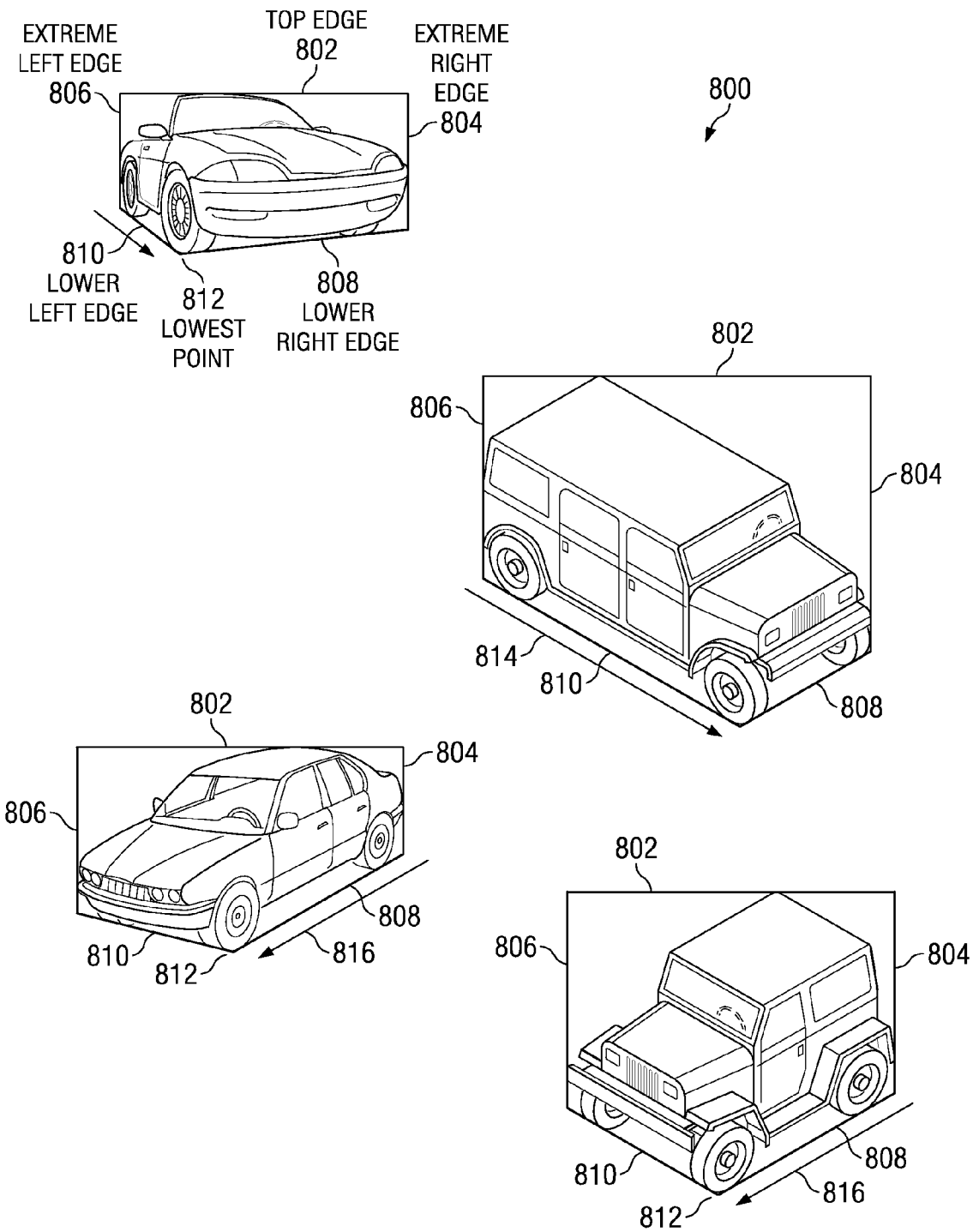
FIG. 8 is a block diagram illustrating a pentagonal edge detection definition for a vehicle in accordance with an illustrative embodiment.

Referring now to FIG. 8, a block diagram illustrating a pentagonal edge detection definition for a vehicle is shown in accordance with an illustrative embodiment. A unique outer edge is used to define the object representing each individual vehicle in the parking facility. In this illustrative example, the outer edge is a pentagon-shaped or pentagonal outer edge frame. However, the outer edge can be any polygonal shaped outer edge. The polygonal outer edge can be used to define an object representing any type of vehicle, including vehicles having two-wheels, three-wheels, and vehicles having four or more wheels.

Pentagonal outer edge frame 800 has top edge 802, extreme right edge 804, extreme left edge 806, lower right edge 808, and lower left edge 810 forming a five sided pentagonal frame defining the edges of each vehicle. Lowest point 812 of pentagonal outer edge frame 800 is the point where a wheel of a vehicle touches the ground. In this example, point 812 is a point where a front wheel contacts the ground.

Lower right edge 808 and lower left edge 810 represent the edge for the wheels and the edge for either the lower front or the lower back of the vehicle. In a set of consecutive camera images, moving from frame to frame, the vehicle will always travel or move along the general direction of lower left edge as in 814, or along lower right edge 808 as in 816.

Pentagonal outer edge frame 800 can be defined precisely given only eight (8) independent parameters. The eight independent parameters include seven (7) positional parameters and one parameter to define which lower edge, either 808 or 810, has the front and back wheels.

The process uses edge detection based on pentagonal outer edge frame 800 and point identification to identify the location of a vehicle. Point identification refers to identifying the points of a pentagonal outer edge for a given vehicle. A "point" is the intersection of two edge lines of the pentagonal outer edge frame for a given vehicle to create a point. A pentagonal outer edge frame can have five (5) different points at which the outer edges intersect. Thus, a vehicle can be identified in accordance with the edges of the pentagonal outer edge frame and the intersection of the edge lines or "points" of the outer edge.

The process also stores the key lines and points associated with the vehicle in the object representing the vehicle. The key lines and points will change slightly from frame to frame as the vehicle moves and changes position, but the key lines and points can be used to identify a vehicle in confusing or overlapping situations, such as when a small vehicle is partially obscured from the camera view by a larger vehicle.

However, prior to utilizing the edge detection process to locate vehicles in a parking facility, each video camera should be calibrated. Calibration of a camera is performed when the area, section, or level of the parking facility in the camera view is empty of vehicles.

During calibration, a test vehicle is driven around a predetermined course in the given parking area. The test vehicle drives into selected parking bays in a precise order. The parking bays selected are usually the first parking bay and the last parking bay in a bank or row of parking bays. The camera will follow the vehicle and notice when the vehicle stops in a parking bay. In other words, the camera records a set of camera images of the test vehicle as it drives on access roadways and pulls into one or more pre-selected parking bays. This allows the process controller to calculate the location of each parking bay, the scale of each parking bay in the pixel image, and the orientation of a vehicle in a parking bay.

The process controller will also calculate positional pixel data for each parking bay and each section of the access road. Positional pixel data is data for associating a pixel with a real world location in the parking facility. Positional pixel data includes an assignment of each pixel in the camera with a real world location in a parking bay or an access road.

The process controller generates positional pixel data based on the pre-defined parking map, the predetermined course for the test vehicle, and the calibration set of images captured while the test vehicle drove through the predetermined course. The process controller does not need precise information regarding the camera location or orientation of the camera in order to calculate positional pixel data.

If a camera fails, is knocked out of place, or otherwise moved to a different location or different position, the camera should be re-calibrated by once again driving a test vehicle through a predetermined course when the parking facility does not contain any other vehicles besides the test vehicle.

In accordance with another illustrative embodiment, a camera can be re-calibrated in a cross camera situation by using the overlapping pixel information from one or more other cameras. In this example, if cars are already located in the parking bys, the camera being recalibrated can determine the lowest point on a pentagonal outer edge frame for a vehicle, the lower right edge, and lower left edge, such as 808-812 in FIG. 8, for each parked vehicle. This reconstruction may be an approximation due to the obscuring of some vehicles in the camera view by other vehicles. The obscuring of portions of the vehicles in the parking facility will force the edge detection process to approximate some of the outer edges of the pentagonal outer edge frame.

However, the edge detection process will be able to determine more accurate locations for new vehicles arriving into the parking facility. The obscuring of portions of a pentagonal outer edge frame for a newly arriving vehicle is not a problem because the edge detection process is able to obtain a complete or unobstructed view of the new vehicle when the vehicle first arrives at the parking facility. If the new vehicle is obscured by another vehicle after the new vehicle arrives, the edge detection process still has the complete, initial, unobscured pentagonal outer edge frame definition for the vehicle. The edge detection process uses this initial pentagonal outer edge frame for the vehicle to extrapolate the location of the vehicle when portions of the vehicle are hidden from the cameras view by another vehicle.

The process can determine an accurate location of a vehicle without being provided with information regarding the location of the camera(s), the direction of the camera lens, the height of the camera above the ground, what is horizontal where the parking facility is on an incline, and a distance of a parking bay from the camera.

The process can calculate an accurate location for a vehicle based on the camera constant "C" radians between each pixel in the camera, the predefined parking map, and the positional pixel data obtained during calibration of the camera.

Figure 9:
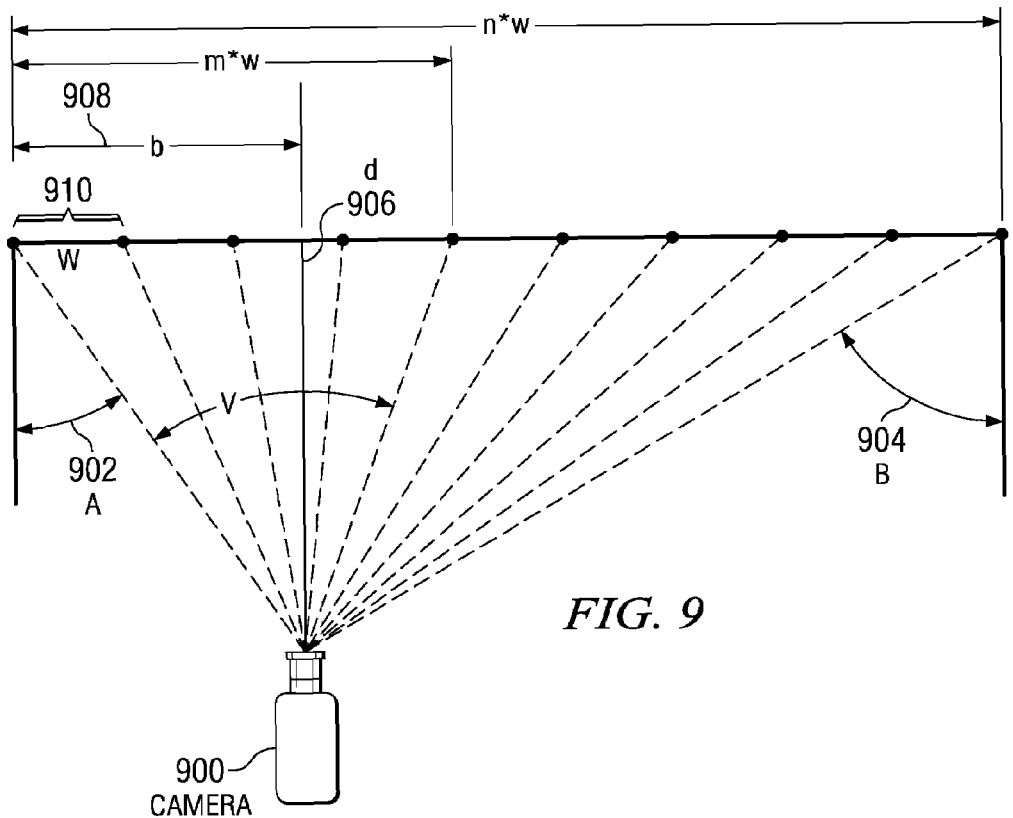
FIG. 9 is a block diagram of a view looking down on a part of a parking facility in accordance with an illustrative embodiment.

FIG. 9 is a block diagram of a view looking down on a part of a parking facility in accordance with an illustrative embodiment. Camera 900 is a camera such as camera 300 in FIG. 3.

The part of the parking facility in the camera's view includes a number of parking bays represented by "n." In this example, camera 900 is calibrated by driving a test vehicle through a predetermined course that includes pulling into the first and last parking bays in a bank or row of parking bays. During calibration of camera 900, the edge detection process can determine the lowest point of a pentagonal outer edge frame for the test vehicle parked in the first and last bays, as shown at 812 in FIG. 8.

The edge detection process can also determine angle "A" 902 between camera 900 and the direction of the test vehicle in the first parking bay and angle "B" 904 between camera 900 and the direction of the test vehicle parked in the last parking bay. For example, angle "A" 902 can be determined as the angle between the direction of a vehicle in the first bay and a vertical y axis. Angle "B" 904 can be determined as the angle between the direction of a vehicle in the last bay and a vertical y axis.

The direction of the test vehicle is determined based on the lower edge that has the front and back wheels of the test vehicle, either the lower right edge or the lower left edge, as shown in 808 and 810 in FIG. 8.

The distance of camera 900 from the line of parking bays is distance "d" 906. The distance from the first parking bay to a perpendicular line running from camera 900 is "b" 908. The width of a given parking bay in the line of parking bays is variable "w" 910. The height "h" is the height or displacement of the camera above the floor, such as height 702 in FIG. 7.

The eight location parameters used to generate a pentagonal edge detection frame for a vehicle and determine an accurate location of a vehicle can be determined independently of the variables "A" 902, "B" 904, "d" 906, "b" 908, "w" 910, and "h". These variables can be calculated during calibration of camera 900, as shown in the discussion of FIG. 10.

The edge detection process calculates the angle "V" for each parking bay based on positional pixel data, the predefined parking map, and the camera constant "C", which is the angle in radians between two pixels in either the horizontal or vertical direction in the camera. The variable "V" is an angle for each parking bay from camera 900. The variable "m" identifies a particular parking bay.

Figure 10:
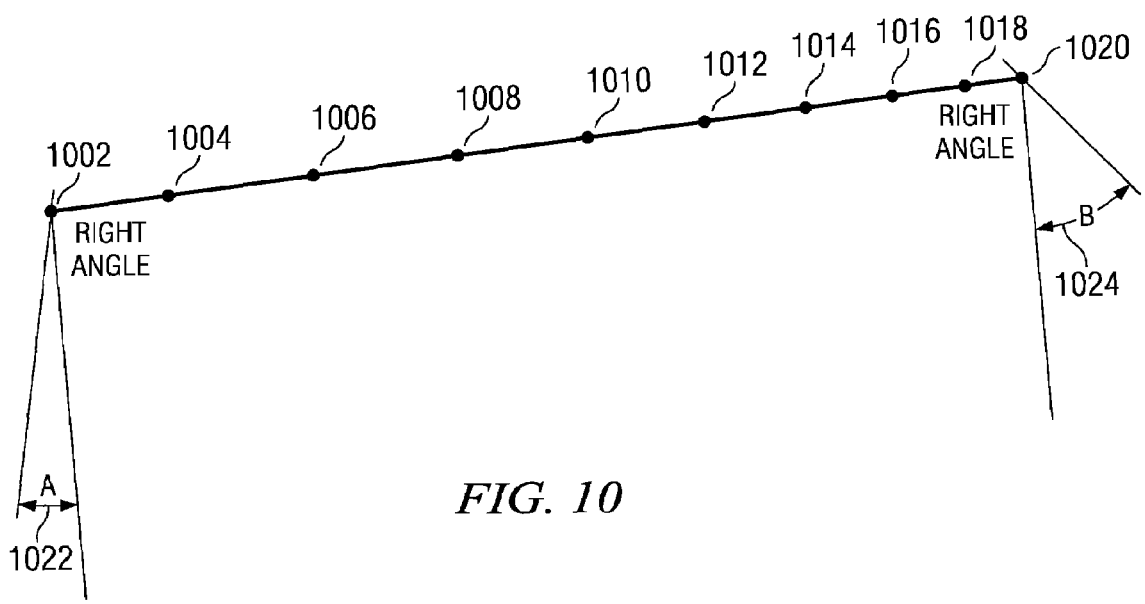
FIG. 10 is a block diagram of a two-dimensional image in a camera during calibration of the camera in accordance with an illustrative embodiment.

Turning now to FIG. 10, a block diagram of a two-dimensional image in a camera during calibration of the camera is shown in accordance with an illustrative embodiment.

The two-dimensional image is a pixel image of the parking area shown in FIG. 9. The points representing each parking bay are not spaced equally because parking bays located at a greater distance away from the camera are represented by fewer pixels in the camera image than parking bays that are located closer to the camera. In other words, distant parking bays are about one-fifth (⅕) of the number of pixels than for parking bays located closer to the camera.

The edge detection process assumes that the points representing each parking bay 1002-1020 are in a straight line even though they are not equally spaced in the camera image. The process assumes the angle between the direction of the test vehicle in the first bay and a vertical y axis will be "A" 1022. The direction of the test vehicle is determined based on the lower edge of the pentagonal outer edge frame that has the front and back wheels, as shown in 808-810 in FIG. 8. The process assumes the angle between the direction of the test vehicle in the last bay and a vertical y axis will be "B" 1024. Any slope in the floor of the parking facility will be irrelevant to the calculation of the eight location parameters.

The equations for calculating the first three parameters of the eight location parameters are as follows:

$$\text{Math.tan}(A) = b/d. \quad\quad 1.$$

$$\text{Math.tan}(B) = (n^*w - b)/d. \quad\quad 2.$$

$$\text{Math.tan}(V - A) = (m^*w - b)/d. \quad\quad 3.$$

The equations are shown in Java math syntax. The Math.tan method is a math class method that returns the tangent of an angle, such as angle "A" or angle "B." Based on the first and second equations, the fourth and fifth parameters can be calculated as follows:

$$b = (n^* w^* \text{Math.tan}(A))/(\text{Math.tan}(A) + \text{Math.tan}(B)); \quad\quad 4.$$

$$d = (n^* w)/(\text{Math.tan}(A) + \text{Math.tan}(B)); \quad\quad 5.$$

The third formula can be substituted in to obtain the sixth equation, which is as follows:

$$\text{Math.tan}(V - A) = (m^*(\text{Math.tan}(A) + \text{Math.tan}(B))/n - \text{Math.tan}(A). \quad\quad 6.$$

Finally, the seventh parameter is calculated as follows:

$$V = A + \text{Math.tan}((m^*(\text{Math.tan}(A) + \text{Math.tan}(B))/n - \text{Math.tan}(A)). \quad\quad 7.$$

The number of pixels from the first bay to the $m^{th}$ parking bay can be calculated as follows:

$$\text{Number of pixels} = V/C.$$

The variable "V" is independent of camera position. Therefore, the camera and edge detection process controller can be calibrated without knowing where the camera(s) are located.

In accordance with an illustrative embodiment, when a new vehicle enters the parking garage, the new vehicle is identified. The new vehicle can be identified by associating an identifier with the vehicle. An identifier can be associated with the vehicle based on issuing a parking ticket to the vehicle, scanning or reading an ID badge for the vehicle or the driver of the vehicle, a parking sticker, a license plate number for the vehicle, or any other known or available means for identifying a vehicle and/or a driver of a vehicle.

A camera at the entrance of the parking facility records or captures a set of initial camera images of the identified vehicle. The camera at the entrance should be well positioned in order to obtain a clear and un-obstructed profile of each vehicle entering the parking facility. Based on an edge detection analysis of the identified vehicle, the edge detection process controller calculates the eight location parameters and generates a pentagonal outer edge frame definition for the identified vehicle.

Figure 11:
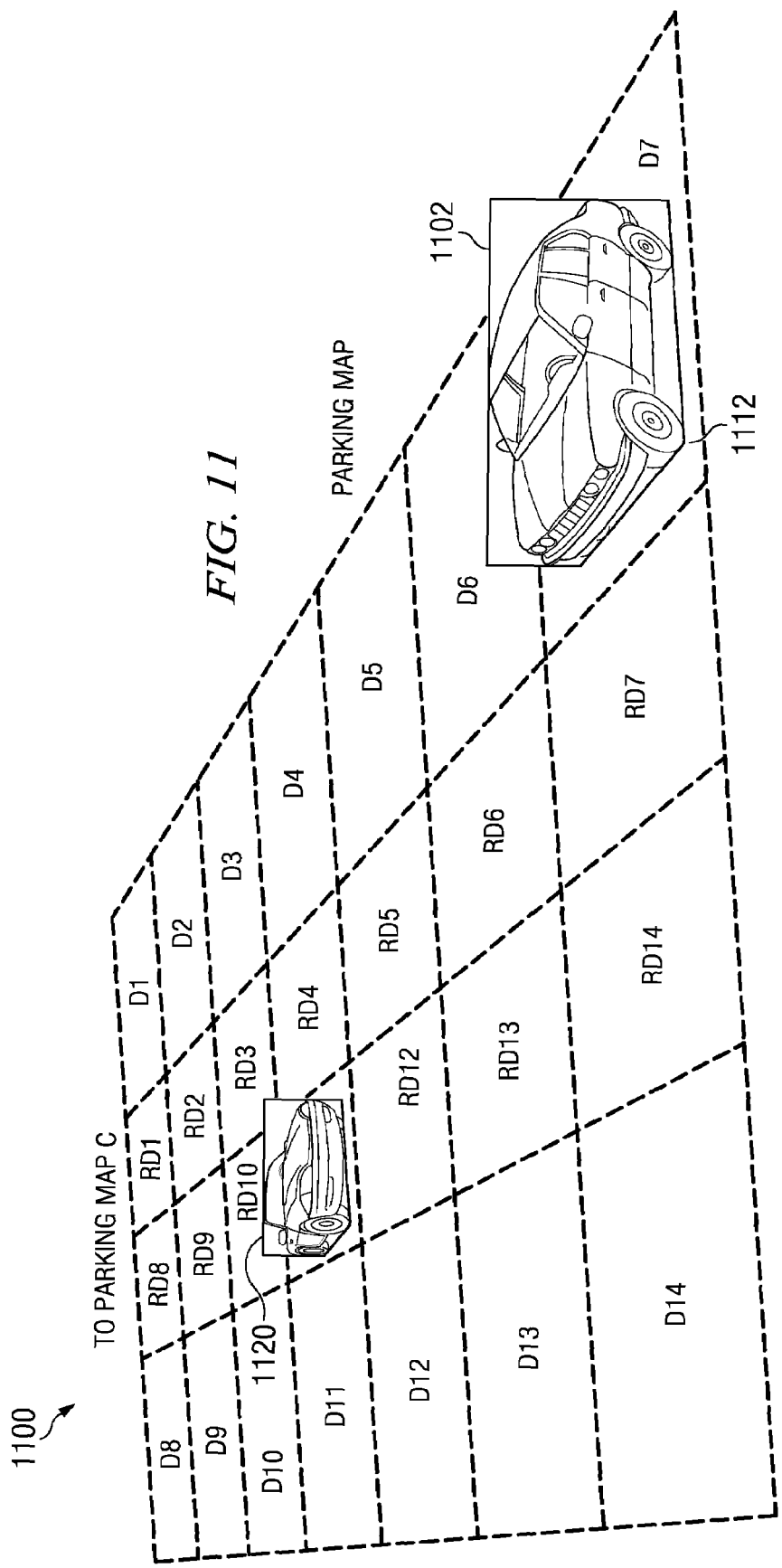
FIG. 11 is a block diagram of a two-dimensional pixel image in a camera for locating a vehicle in a parking facility in accordance with an illustrative embodiment.

FIG. 11 is a block diagram of a two-dimensional pixel image in a camera for locating a vehicle in a parking facility in accordance with an illustrative embodiment. Pixel image 1100 is a camera image of a level, section, or area of a parking facility. The edge detection process identifies vehicle 1102 as it enters the parking facility. The process generates a pentagonal outer edge frame for vehicle 1102. The process determines lowest point 1112 of the pentagonal outer edge frame. Lowest point 1112 is a point at which vehicle 1102 is assumed to be in contact with the ground.

The process identifies a real world location in the parking facility assigned to the pixel(s) at lowest point 1112. In this manner, the process can determine an accurate location for vehicle 1102 within a few inches simply by locating the pixel(s) at lowest point 1112 of the pentagonal outer edge frame for the identified vehicle. In this case, vehicle 1102 is identified as being located in parking bay D7.

Likewise, the edge detection process can determine a location of a vehicle moving through the parking facility, such as vehicle 1120. Once again, vehicle 1120 was identified when vehicle 1120 entered the parking facility. The process uses a set of consecutive images of vehicle 1120 taken by a single camera as vehicle 1120 moves through the field of view of camera 1120. The process determines a location for vehicle 1120 by locating a lowest point of the pentagonal outer edge frame for vehicle 1120. In this case, the pixel(s) at the lowest point in the pentagonal outer edge frame are assigned to an access roadway designated RD11. Thus, the edge detection process can locate vehicles that are parked in a parking bay or moving on an access road.

In accordance with the illustrative embodiments, the edge detection process can track a vehicle through a parking facility even if part of the vehicle is obscured by another vehicle. The edge detection process generates a pentagonal outer edge frame for each vehicle when the vehicle first arrives at the parking facility. Thus, the edge detection process knows what the pentagonal outer edge frame for a given vehicle should look like even if part of the pentagon is hidden behind an obstruction. In addition, the expected scale and orientation of the vehicle is contained in the object representing the vehicle. Therefore, the edge detection process can extrapolate an accurate location for a vehicle even if part of the vehicle is obscured from the camera's view by another vehicle.

FIG. 12 is a block diagram of a parking garage with a high ceiling in accordance with an illustrative embodiment. Camera 1200 is a camera, such as camera 300 in FIG. 3. The edge detection process can detect a vehicle that is close and large in the camera image without difficulty. In addition, open air parking lots, where a camera can be located at a height above 20 feet will not present any problems to the edge detection process. For example, if camera 1200 is located twenty (20) feet above the ground, camera 1200 has a relatively large angle from the lens of camera 1200 to each parking bay 1202-1226.

However, some parking facilities have ceiling heights of no more than ten (10) feet. In such a case, the narrow angle from the camera lens to the farthest parking bays, such as parking bays located more than one-hundred (100) feet away from the camera, may result in a loss of accuracy in defining the precise parking bay in which a vehicle is located.

Referring to FIG. 13, a block diagram of a parking garage with a low ceiling is shown in accordance with an illustrative embodiment. Camera 1300 is a camera, such as camera 300 in FIG. 3.

In this example, camera 1300 is located only ten (10) feet above the ground. The width of the parking facility is about seventy (70) feet and the length of the row of barking bays 1302-1326 is about two-hundred (200) feet. Camera 1300 has a ninety (90) degree view. The camera image is 640×480 pixels.

If the parking bays are ten (10) feet wide, the tenth parking bay from the camera will be about 110 feet away. The angle between the camera and the ground at the tenth parking bay 1320 will be about 0.091 radians. The eleventh parking bay 1322 will have an angle of approximately 0.083 radians. The difference of 0.008 radians will require about three (3) pixels in the camera image. Although 0.008 radians is a small difference, it will be sufficient for the edge detection process to distinguish the tenth parking bay from the eleventh parking bay.

In another illustrative embodiment, camera 1300 can include a special lens, such as an anamorphic lens. An anamorphic lens is a lens that squeezes a picture horizontally. An example of an anamorphic lens is a "cinemascope" type lens used to project wide angle movies. The anamorphic or wide angle lens would need to about twenty-five (25) degrees in the vertical plane, rather than ninety degrees in the vertical plane.

A wide angle lens would be able to see the ground in the access roadway at the nearest point to the camera. The lens would increase the number of pixels to approximately ten (10) pixels, rather than only three (3). This would provide more than enough pixels to distinguish each parking bay and access road in order to determine an accurate location of every vehicle in the parking facility.

In another illustrative example, camera 1300 uses the horizontal angle, as well as the vertical angle to determine the location of a vehicle. The horizontal angle to the tenth parking bay is about 0.5 radians. The horizontal angle to the eleventh parking bay is about 0.55 radians. The difference is about 18 pixels in the horizontal direction. This is sufficient to make a very accurate differentiation between parking bays. However, in this example, the process cannot distinguish between a vehicle in one bay that sticks out and obstructs a vehicle in the next bay that is parked well in because the angle is horizontal.

If the edge detection process can distinguish the parking bay line between the tenth and eleventh bays, the process will be able to tell which side of the line the vehicle is parked on. In addition, the initial pentagonal outer edge profile of the vehicle is known. Based on the parking bay lines and pentagonal outer edge profiles, the process can assume that a large vehicle will be sticking out of the parking bay and a smaller vehicle might be parked well in and obscured from view. In this manner, the process can determine a location for vehicles when the ceiling of a parking facility is low and/or a vehicle is obscured behind another vehicle.

FIG. 14 is a flowchart illustrating a process for tracking a vehicle in a parking facility in accordance with an illustrative embodiment. In the illustrative example in FIG. 14, the process is implemented by software for performing an edge detection process, such as controller 306 in FIG. 6.

The process begins by retrieving a pre-defined parking facility map (step 1402). The process makes a determination as to whether the camera(s) are calibrated (step 1404). If the camera(s) are not calibrated, the process calibrates the camera (s)(step 1406).

The process makes a determination as to whether a new vehicle is detected entering the parking facility (step 1408). If a new vehicle is not detected, the process terminates thereafter. If a new vehicle is detected entering the parking facility, the process assigns a vehicle identifier to the vehicle (step 1410).

Next, the process locates the vehicle in the parking facility using edge detection process and point identification (step 1412). The process can detect an edge by taking the difference between two images. The process can determine if a vehicle has remained stationary or changed location by applying an exclusive "OR" principle to compare the pixels in the two images. The process stores the location of the new vehicle in a database (step 1414) with the process terminating thereafter.

Figure 15:
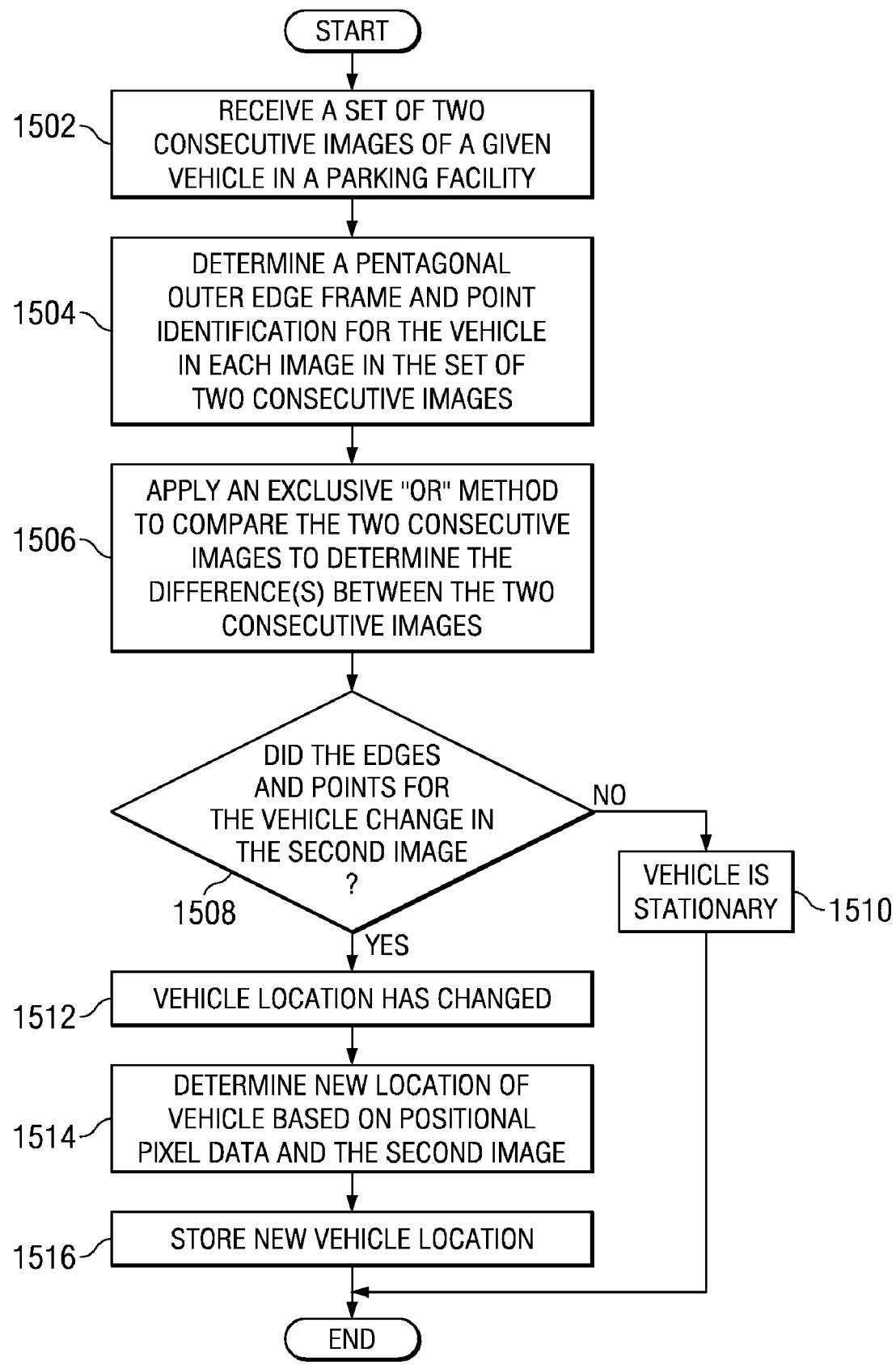
FIG. 15 is a flowchart illustrating a process for calibrating a camera in accordance with an illustrative embodiment.

FIG. 15 is a flowchart illustrating a process for locating a vehicle using edge detection and point identification in accordance with an illustrative embodiment. The illustrative process shown in FIG. 15 is implemented by software for performing an edge detection and point identification process, such as controller 306 in FIG. 3.

The process begins by receiving a set of two consecutive images of a given vehicle in a parking facility (step 1502) from a camera. The process determines a pentagonal outer edge frame and point identification for the vehicle in each image in the set of two consecutive images (step 1504).

The process applies an exclusive "OR" method to compare the pixels in the two consecutive images in order to determine the difference(s) between the two consecutive images (step 1506). For example, an image can be viewed as a two dimensional array of pixels. Each pixel within the two dimensional array of pixels forming the image has certain characteristics. By comparing the pixels in two consecutive images, the process can tell if a vehicle or any other object represented by pixels within the image has remained stationary or has changed position. Thus, the process uses an exclusive "OR" principle to detect the edges of a pentagonal outer edge frame for a vehicle and to determine the points of the vehicle. The process then compares the edges and points for a given vehicle to determine whether the vehicle has changed position.

The process makes a determination as to whether the edges and points for the given vehicle have changed in the second image as compared with the first image (step 1508). If the process determines that the edges and points have not changed, the process determines that the vehicle is stationary (step 1510) and the process terminates thereafter.

Returning now to step 1508, if the edges and points for the given vehicle have changed in the second image, the process determines the vehicle has changed location (step 1512). The process determines a new location for the given vehicle based on positional pixel data and the second image (step 1514). The positional pixel data identifies a location in the parking facility represented by a given pixel in the second image. The process stores the new vehicle location in a data storage device, such as data storage device 108 in FIG. 1, (step 1516) with the process terminating thereafter.

FIG. 16 is a flowchart illustrating a process for calibrating a camera in accordance with an illustrative embodiment. The illustrative process shown in FIG. 16 is implemented by software for performing an edge detection process, such as controller 306 in FIG. 6.

The process begins by determining a camera constant "C," which is the angle in radians between two pixels in the camera image, for the camera being calibrated (step 1602). The process captures a set of images as a test vehicle drives around a predetermined course through an empty parking facility (step 1604). The process calculates positional pixel data for each parking bay (step 1606). The positional pixel data indicates a real world location in the parking facility for each pixel in the camera image representing a location in a parking bay.

The process calculates positional pixel data for access roads in the parking facility (step 1608). The positional pixel data for access roads indicates or assigns a real world location in the parking facility to each pixel in the camera image corresponding to a location on an access road. The process records the positional pixel data for the parking bays and access roads in a database (step 1610) with the process terminating thereafter.

Thus, the illustrative embodiments provide a computer implemented method, apparatus, and computer usable program code for managing vehicles in a parking facility using optics. The process receives a series of two-dimensional images of a vehicle in a parking facility from a camera. The process generates an object representing the vehicle based on the series of two-dimensional images. The object includes a set of parameters defining a pentagonal outer edge frame for the vehicle. The process determines a location of the vehicle in the parking garage based on the pentagonal outer edge frame and positional pixel data for the parking facility.

The process can use two-dimensional images from a single camera to determine the precise position of objects. This enables the process to manage, track, and/or locate objects with lower cost and complexity than multi-camera solutions. In addition, the edge detection process is simpler to program and has greater accuracy than prior art pattern matching techniques used to identify vehicles. Moreover, the edge detection process is independent of shade and color changes that occur in sunlight or artificial lighting situations. Thus, edge detection techniques are consistently more accurate in the presence of environmental lighting changes than pattern identification techniques.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain or store the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for tracking vehicles in a parking facility, the computer implemented method comprising the steps of:
   receiving a first series of two-dimensional images of a vehicle in the parking facility from a first camera;
   generating an object representing the vehicle based on the first series of two-dimensional images, wherein the object includes a set of parameters defining an outer edge frame for the vehicle, wherein the outer edge frame is a pentagonal outer edge frame;
   receiving a plurality of pixels for a camera image of the parking facility;
   assigning each pixel in the plurality of pixels to a corresponding location in the parking facility, wherein assigning creates data describing the assigning;
   determining a location of the vehicle in the parking facility based on the outer edge frame and the data; and
   identifying a direction of the vehicle based on only a right lower edge and a left lower edge of the pentagonal outer edge frame, wherein the right lower edge and the left lower edge indicate a direction of a set of wheels on the vehicle.

2. The computer implemented method of claim 1 further comprising:

receiving a second series of two-dimensional images of the vehicle in the parking facility from a second camera; and determining the location of the vehicle based on the first series of two-dimensional images from the first camera and the second series of two-dimensional images from the second camera.

3. The computer implemented method of claim 1 wherein the step of determining the location of the vehicle further comprises:

identifying a pixel in the camera image at a lowest point of the outer edge frame for the vehicle; and determining a location of the pixel at the lowest point of the outer edge frame based on the data.

4. The computer implemented method of claim 1 wherein the outer edge frame is a pentagonal outer edge frame and further comprising:

generating the outer edge frame for the vehicle based on eight location parameters for the vehicle.

5. The computer implemented method of claim 1 further comprising:

determining an angle in radians between two pixels in a camera image generated by the first camera.

6. The computer implemented method of claim 1 further comprising:

capturing a series of consecutive images as a test vehicle is driven around a pre-determined course through an area of the parking facility to form a set of calibration images; and calculating the data from the set of calibration images.

7. The computer implemented method of claim 1 further comprising:

retrieving a pre-defined parking map for an area of the parking facility, wherein the pre-defined parking map provides information regarding the location of parking bays and access roads in the parking facility; and generating the data based on the pre-defined parking map and calibration data obtained during calibration of the camera.

8. A computer program product for tracking vehicles in a parking facility, the computer program product comprising:

one or more computer-readable tangible storage devices;

program instructions, stored on at least one of the one or more storage devices, to receive a series of first two-dimensional images of a vehicle in a parking facility from a first camera;

program instructions, stored on at least one of the one or more storage devices, to generate an object representing the vehicle based on the first series of two-dimensional images, wherein the object includes a set of parameters defining an outer edge frame for the vehicle, wherein the outer edge frame is a pentagonal outer edge frame;

program instructions, stored on at least one of the one or more storage devices, to receive a plurality of pixels for a camera image of the parking facility;

program instructions, stored on at least one of the one or more storage devices, to assign each pixel in the plurality of pixels to a corresponding location in the parking facility, wherein assigning creates data describing the assigning;

program instructions, stored on at least one of the one or more storage devices, to determine a location of the vehicle in the parking facility based on the outer edge frame and the data; and program instructions, stored on at least one of the one or more storage devices, to identify a direction of the vehicle based on only a right lower edge and a left lower edge of the pentagonal outer edge frame, wherein the right lower edge and the left lower edge indicate a direction of a set of wheels on the vehicle.

9. The computer program product of claim 8 further comprising:

program instructions, stored on at least one of the one or more storage devices, to receive a second set series of two-dimensional images of the vehicle in the parking facility from a second camera; and computer usable program code for program instructions, stored on at least one of the one or more storage devices, to determine the location of the vehicle based on the first series of two-dimensional images from the first camera and the second series of two-dimensional images from the second camera.

10. The computer program product of claim 8, wherein the program instructions to determine the location of the vehicle:

identify a pixel in the camera image at a lowest point of the outer edge frame for the vehicle; and determine a location of the pixel at the lowest point of the outer edge frame based on the data.

11. The computer program product of claim 8 further comprising:

program instructions, stored on at least one of the one or more storage devices, to determine an angle in radians between two pixels in a camera image generated by the first camera.

12. The computer program product of claim 8 further comprising: program instructions, stored on at least one of the one or more storage devices, to generate the pentagonal outer edge flame for the vehicle based on eight location parameters for the vehicle.

13. A system for tracking vehicles in a parking facility using optics, the system comprising:

a first camera configured to capture a first series of two-dimensional images of a vehicle in a parking facility; and a controller configured to:

generate an object representing the vehicle based on the first series of two-dimensional images, wherein the object includes a set of parameters defining an outer edge frame for the vehicle, wherein the outer edge frame is a pentagonal outer edge frame;

receive a plurality of pixels for a camera image of the parking facility; assign each pixel in the plurality of pixels to a corresponding location in the parking facility, wherein assigning creates data describing the assigning;

determine a location of the vehicle in the parking facility based on the outer edge frame and the data; and identify a direction of the vehicle based on only a right lower edge and a left lower edge of the pentagonal outer edge frame, wherein the right lower edge and the left lower edge indicate a direction of a set of wheels on the vehicle.

14. The system of claim 13 further comprising:

a second camera configured to capture a second series of two-dimensional images of the vehicle in the parking facility, wherein the location of the vehicle is determined based on the first series of two-dimensional images from the first camera and the second series of two-dimensional images from the second camera.

15. An apparatus comprising:

a set of cameras configured to capture a series of two-dimensional images of a vehicle in a parking facility;

a storage device connected to a bus, wherein the storage device contains a computer usable program; and a processor, wherein the processor executes computer usable program to:
  receive the series of two-dimensional images of the vehicle in the parking facility from the set of cameras;
  generate an object representing the vehicle based on the series of two-dimensional images, wherein the object includes a set of parameters defining an outer edge frame for the vehicle, wherein the outer edge frame is a pentagonal outer edge frame;
  receive a plurality of pixels for a camera image of the parking facility;
  assign each pixel in the plurality of pixels to a corresponding location in the parking facility, wherein assigning creates data describing the assigning;
  determine a location of the vehicle in the parking facility garage based on the outer edge frame and the positional pixel data; and
  identify a direction of the vehicle based on only a right lower edge and a left lower edge of the pentagonal outer edge frame, wherein the right lower edge and the left lower edge indicate a direction of a set of wheels on the vehicle.

16. The apparatus of claim 15 wherein the set of cameras includes at least two cameras.

17. The computer implemented method of claim 1, wherein the each pixel is associated with a distinct corresponding pixel object that contains properties associated with the each pixel.

18. The computer implemented method of claim 17 wherein the distinct corresponding pixel object includes scale and rotational properties for the vehicle.

* * * * *